United States Patent Office 3,796,625
Patented Mar. 12, 1974

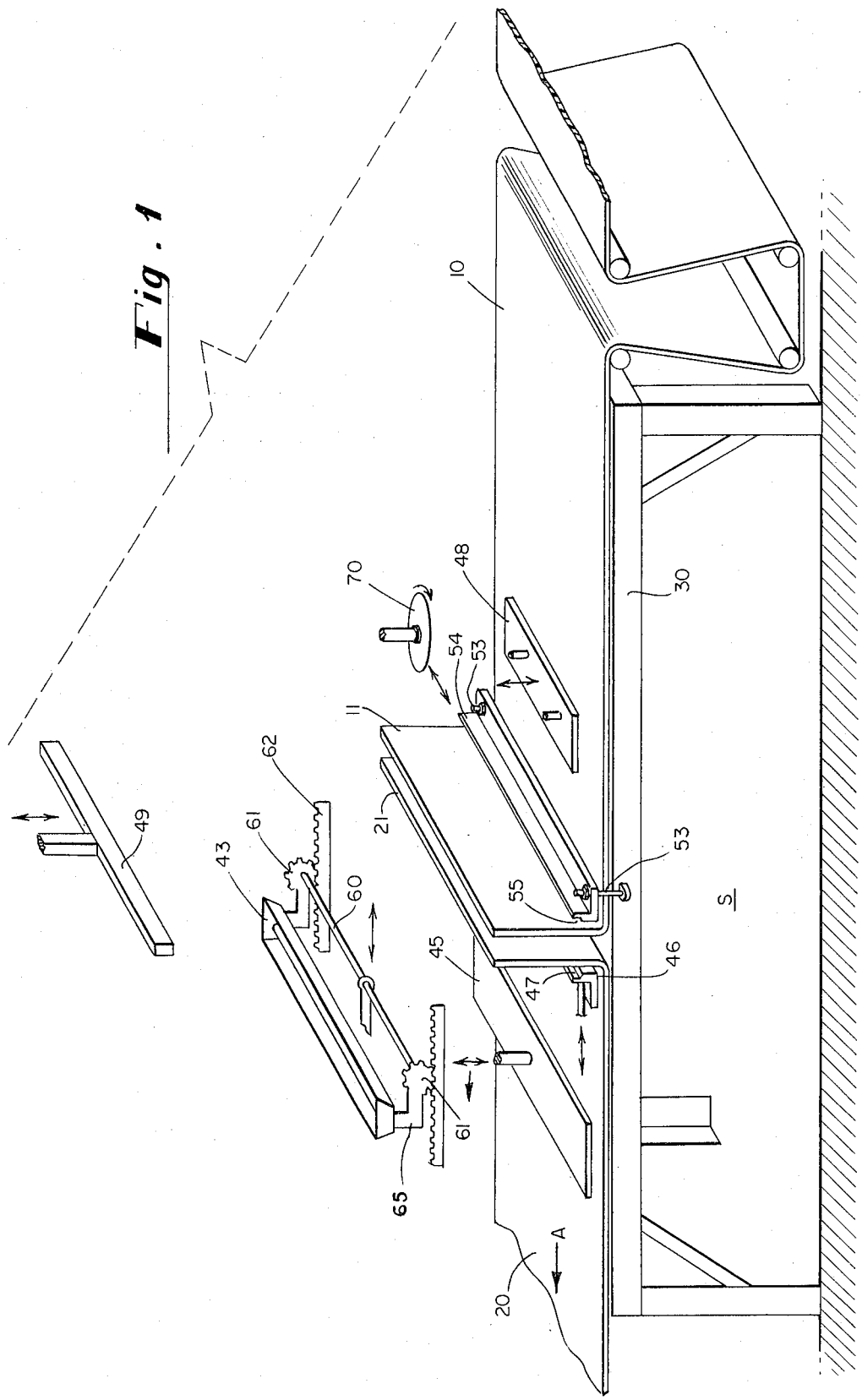

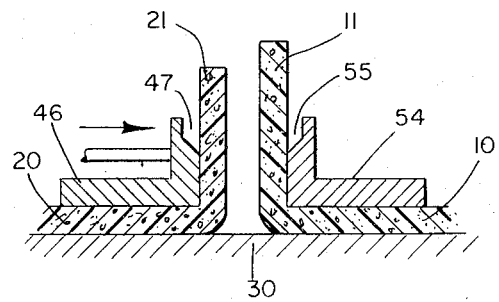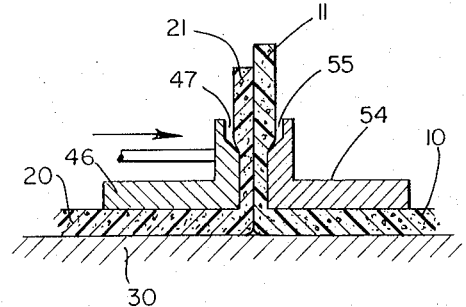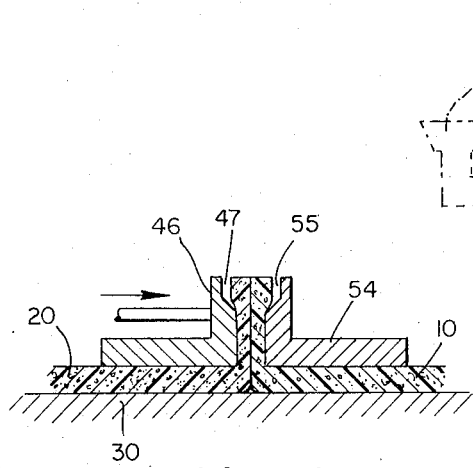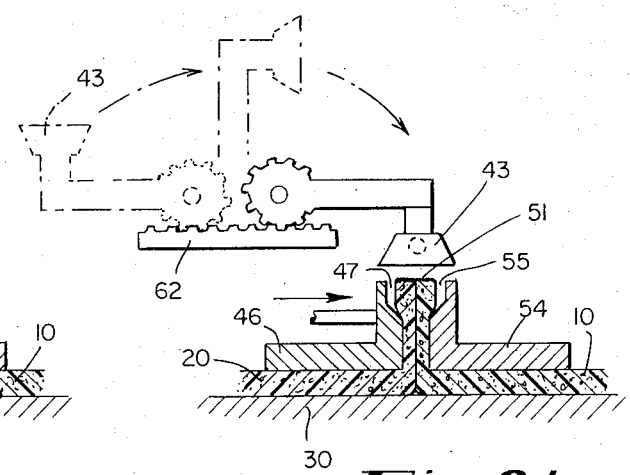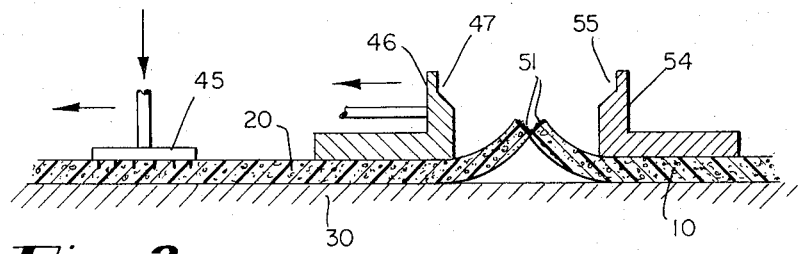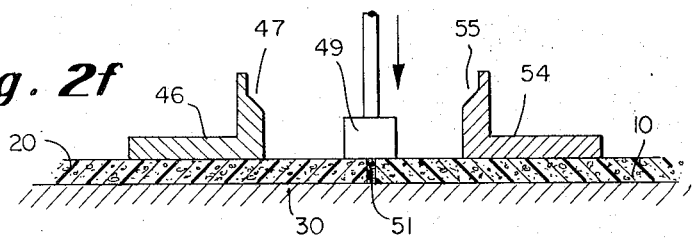

3,796,625
BUTT SPLICING THERMOPLASTIC SHEETING
James C. Rutledge, Calhoun, Ga., assignor to Collins & Aikman Corporation, New York, N.Y.
Filed Feb. 11, 1972, Ser. No. 225,431
Int. Cl. B65h 19/00
U.S. Cl. 156—502          6 Claims

ABSTRACT OF THE DISCLOSURE

The trailing terminal end of a roll of compressible thermoplastic web material is joined to the leading end of a following roll by turning the trailing and leading end portions upwardly adjacent to each other, clamping them tightly together, trimming off the clamped edges above the clamp, directing radiant heat downwardly upon the upturned trimmed edges to melt and partially fuse the edges, removing the heat and simultaneously releasing the clamp and pulling the trailing end of the lead roll downstream a preselected distance to allow the partially fused ends to merge downwardly without placing the seam under tension, and immediately applying an unheated press bare to flatten the still-hot partially fused seam to shape and set the seam.

BACKGROUND OF THE INVENTION

The present invention relates to a method and apparatus for splicing thermoplastic web materials.

Prior art methods of joining together the ends of thermoplastic sheet materials include lap welding, as in U.S. Pat. 3,472,721.

The prior art also includes butt splicing of web materials in which tapes are secured on each side of the butt joint, as in U.S. Pat. 2,987,108.

The prior art also includes butt splicing of thermoplastic web materials by a hot wire which trims and melts to form a bead. In this method, disclosed in U.S. Pat. 3,384,527, the bead is allowed to cool and set to allow the leading sheet to pull the following sheet to a succeeding position without the two sheets coming apart at the bead. At the succeeding position, the bead is reheated and pressed into a flattened condition to form the final seam.

SUMMARY OF THE INVENTION

A primary object of the present invention is to provide an improved method and means for heat joining the ends of two webs of thermoplastic material.

A further object is to provide an improved method and means for butt splicing two webs of thermoplastic material.

Another object is to provide means for butt splicing two webs of thermoplastic material without having to reheat the bead.

Another object is to provide an improved means and method for heat splicing two webs of thermoplastic material without having to pull the initial splice from a first position to a second position for reheating and reforming.

Another object is to form an improved splice connecting two webs of thermoplastic material.

BRIEF DESCRIPTION OF THE DRAWINGS

FIG. 1 is a schematic perspective view of an apparatus for carrying out the method of the present invention.

FIGS. 2(a) to 2(f) are a series of sequential illustrations showing how the butt joint is formed by the method and means of the present invention.

DETAILED DESCRIPTION OF THE PREFERRED EMBODIMENTS

In FIG. 1, it may be assumed that the web of thermoplastic material 20 is being fed from right to left, as indicated by the arrow A, to a laminating range or to some other sort of processing equipment. The supply roll of web 20 is running out and it is necessary to connect the leading end 11 of a second supply 10 to the trailing end 21 of the exhausted supply. This connection is accomplished by the means illustrated in FIG. 1 in a manner to be described. In FIG. 1, the front of the machine is at the right, with the web material moving from the front of the machine toward the rear. Accordingly, components will be referred to as "fore" or "aft" according to whether they are forward or rearward in the machine.

In FIG. 1, the splicing station is identified as S. The trailing end portion of the sheet 20 of the exhausting supply and the leading portion of the web 10 of the new supply are supported on a table 30. The operator bends the trailing portion 21 of the exhausting sheet 20 upwardly and also bends the leading edge portion 11 of the new sheet 10 upwardly adjacent to the upturned portion 21. A positioning receiver bar 54 is dropped into place on sheet 10 at the bend of the upturned portion 11, by dropping the bar 54 on vertical positioning studs 53. A clamping bar 46 on the rearward side of upturned portion 21 is moved forwardly, as by cylinder-piston mechanism, and held in the forward position to clamp together and to compress the turned-up end portions 11 and 21 of the sheets 10 and 20. The action just described is illustrated in FIGS. 2(a) and 2(b).

Substantially simultaneously with the forward movement of the clamping bar 46, an aft stabilizer plate 45 having a spiked undersurface is lowered, as by cylinder-piston means, and presses the sheet 20 against the table 30. The terminal ends of the upturned portions 11 and 21 are then simultaneously trimmed at the level of receiver bar 54 and clamping bar 46, as by a traversing cutting knife 70. Cutting knife 70 may be any suitable type of cutter. The knife illustrated in FIG. 1 is circular. The cutting edge is critical to a good splice and the cutting knife 70 preferably uses the upper suface of the receiver and clamping bars as a guide. The fore stabilizer plate 48 is then lowered as by cylinder-piston means and presses the sheet 10 against the table 30.

Following the trimming operation, a heat element 43 is moved into place. This may, for example, be a 240-volt 7190-watt Chromalox unit, with reflector. It may be supported and controlled on a track assembly by known types of pneumatic and electrical control equipment. In FIG. 1, heat element 43 is shown supported on brackets 65 secured to toothed wheels 61 which ride on tracks 62. To move the heat element 43 from its retracted rest position, shown in solid in FIG. 1 and in phantom in FIG. 2(d), to its operating position shown in solid line in FIG. 2(d), a cylinder-piston mechanism is actuated to move axle 60, on which wheels 61 are freely rotatable, forwardly (to the right in FIGS. 1 and 2(d)), through a given distance, on the toothed track 62. This forward rotational movement of wheels 61 causes the brackets 65 and the heat element 43 to rotate through 180°, as indicated in phantom in FIG. 2(d). This brings the heat element 43 into position about 2" to 3" above the trimmed upturned clamped ends 11 and 21 of the webs 10 and 20. Thermal radiation, i.e., heat rays, from element 43 are directed downwardly onto the terminal edges of the upstanding ends 11 and 21 causing the edge material to melt and merge. The heater unit is wired with a timer so that when the button is pushed to lower the heat unit, the timer automatically starts. The timer is preset to provide the required heating time for melting of the edge material. The timed cycle may vary, as from 11 to 46 seconds, depending upon thickness of the web material and its composition. If the time is too short, the material will not melt sufficiently to bond together or seam. If the time is too long, the material will fill the grooves 47 and 55 and will stick to the bars 46 and 54. The grooves 47 and 55 are provided in the bars 46 and 54 to allow the edge material to melt without sticking to the bars. When the timer shuts off, the heat element 43 remains energized but is returned to its retracted position. The time period is so selected that the edge material is sufficiently melted by the heat to allow material from each of the ends 11 and 21 to flow into the other so that a partial fusion or bonding may take place at the seam 51.

When, at the end of the time period, the heat element 43 is retracted, the clamping bar 46 is withdrawn rearwardly (to the left in FIGS. 1 and 2(e)) and simultaneously the spiked aft stabilizer plate 45 is moved rearwardly through a preselcted distance thereby moving the web 20 rearwardly through a distance sufficient to allow the partially fused upturned ends of the materials 20 and 10 to fall downwardly toward the table 30. This is illustrated in FIG. 2(e). In moving to the position illustrated in FIG. 2(e), the end of the material 10 moves downwardly toward the left which tends to close the legs of the V of the V-shaped embryo seam. In the position illustrated in FIG. 2(e), the melted still-hot ends 51 are merging, and the seam is forming, without placing any tension on the seam.

In FIG. 2(f) the clamp bar 46 is fully retracted and the press bar 49 has been lowered. The time interval between retracting the heat element 43 at the end of the heat period and lowering of the press bar 49, as shown in FIG. 2(f), is about two seconds.

The unhetated pres bar 49, lowered as by cylinder-piston means into position over the seam 51, as shown in FIG. 2(f), presses down on the still-hot and formable seam 51, thereby flattening and shaping the seam. Bar 49 is held down on the seam 51 about ten seconds before it is retracted. During this time the seam 51 is cooled and set.

In the pressing step, just described, table 30 functions as the back-up plate to receive the downward pressure of the bar 49. Press bar 49, which is unheated, may be aluminum or steel or other metal having good heat conductivity. It also has substantial volume. Accordingly, bar 49 carriers heat away from the seam 51 as it flattens and reshapes the seam. This cools the seam 51 and accelerates its set into its final form, illustrated in FIG. 2(f).

By the method and means disclosed above, two flat surface pieces of thermoplastic material are fused together. No tension is placed on the seam until after it is fully formed and set. The seam has a strength equal to that of the original material. Moreover, there is no bulge or bead at the seam. There may be a slight depression or groove at the seam, but such groove, if any, is slight enough to be commercially acceptable, particularly in laminated materials.

Without intending to be limited to specific sizes or materials, the following is a brief description of a splicing unit which has been developed and is in use.

The heating unit 43 is a Chromalox radiant heater with a ½-inch by 84-inch heating element and a reflector. The clamp bars 46 and 54 which secure the upturned ends together during the heating step, are aluminum, 84 inches long. The knife 70, which trims off the excess ends prior to the heat step, is a flat horizontal knife which traverses the unit flush against the top of the clamps. The unheated press bar 49 which flattens the hot ends into a final seam may be an aluminum bar 84 inches long.

What is claimed is:
1. Apparatus for butt joining two sheets of thermoplastic material, said apparatus comprising:
   (a) support means for supporting the trailing and leading end portions of fore and aft sheets of thermoplastic material to be butt joined together;
   (b) horizontally-movable clamp means above said support means for clamping together adjacent upturned terminal end portions of said fore and aft sheets;
   (c) cutter means for trimming said clamped upturned terminal ends;
   (d) heat means;
   (e) means for moving said heat means into position just above the trimmed clamped edges to heat the edges to cause the same to melt and to flow together into a partially formed seam;
   (f) means for removing the heat means;
   (g) means for removing the clamp means concurrently with the removal of the heat means;
   (h) means for retracting one of said sheets a preset distance to allow said partially-formed seam to move downwardly toward said support means without placing said partially formed seam under tension;
   (i) unheated press means;
   (j) means for moving said press means downwardly to press said partially formed seam to flatten and shape the seam into final form and to remove heat therefrom to set the seam.

2. Apparatus according to claim 1 characterized in that said means for retracting one of said sheets comprises means for retracting said aft sheet.

3. Apparatus according to claim 1 characterized in that said heat means in an elongated radiant heating element.

4. Apparatus according to claim 1 characterized in that said pres means is an elongated metal bar.

5. Apparatus according to claim 1 characterized in that said clamp means include elongated bars having elongated recesses at the position of the trimmed edges which are to be heated and melted to avoid said melted material contacting and sticking to said clamp bars.

6. Apparatus according to claim 2 characterized in that said retracting means includes a spiked surface for engaging the sheet which is to be retracted.

References Cited
UNITED STATES PATENTS

| | | | |
|---|---|---|---|
| 2,947,346 | 8/1960 | Thompson | 156—159 X |
| 3,282,766 | 11/1966 | Wright | 156—544 X |
| 3,438,833 | 4/1969 | Nakano | 156—502 |

WILLIAM A. POWELL, Primary Examiner

U.S. Cl. X.R.

156—159, 304, 544